Nov. 10, 1970 A. W. LINDBERG 3,539,892
MOTOR REGULATING SYSTEM
Filed Aug. 13, 1968 5 Sheets-Sheet 1

INVENTOR:
ALLAN W. LINDBERG
BY
ATTORNEY.

Nov. 10, 1970 A. W. LINDBERG 3,539,892
MOTOR REGULATING SYSTEM
Filed Aug. 13, 1968 5 Sheets-Sheet 4

INVENTOR:
ALLAN W. LINDBERG
BY
ATTORNEY.

FIG.9

United States Patent Office 3,539,892
Patented Nov. 10, 1970

3,539,892
MOTOR REGULATING SYSTEM
Allan W. Lindberg, St. Louis, Mo., assignor to Emerson
Electric Co., St. Louis, Mo., a corporation of Missouri
Filed Aug. 13, 1968, Ser. No. 752,198
Int. Cl. H02p 5/40
U.S. Cl. 318—227        14 Claims

ABSTRACT OF THE DISCLOSURE

A speed control system wherein variations in voltage from an A.C. source are compensated includes a solid state switch electrically connected to the A.C. source, a triggering device for the solid state switch, and a photocouple cell having a lamp and a photoconductive resistor, the lamp being electrically connected, mediately or immediately, to said A.C. source and the photoconductive resistor being electrically connected in parallel to capacitors electrically connected to the triggering device, whereby the charging rate of the capacitors is dependent upon and a function of the resistance of the photoconductive resistor, and the intensity of the lamp, hence the resistance of the photoconductive resistor, is dependent upon and a function of the source voltage. A variable resistor in the lamp circuit is used to accomplish motor speed control.

BACKGROUND OF THE INVENTION

Solid state switches, such as SCR's and Triacs, are commonly used to control the speed of A.C. motors. In such controls, the firing angle of the solid state switch is varied by varying the rate of charging of a triggering device. Heretofore, in order to achieve high sensitivity in the control a rather complicated circuitry has been required. Furthermore, even with a relatively complicated circuit, there has been a tendency for the speed of the controlled motor to vary with variations in the source voltage. The higher the voltage, the more quick the charging rate; the earlier in the cycle the triggering device is energized and the faster the motor has tended to run.

One of the objects of this invention is to provide a simple circuit which can be used to control the firing of a solid state switch, and which compensate for changes in supply line voltage.

Another object is to provide such a circuit which achieves high sensitivity.

Another object is to provide such a circuit which can supply fixed excitation to auxiliary windings of permanent split capacitor (P.S.C.) motors.

Still another object is to provide such a circuit in which an isolated low voltage source can be used to turn the solid state switch on or off.

Still another object is to provide such a circuit in which the firing angle of the solid state switch can be controlled from an isolated, low voltage source.

Other objects will become apparent to those skilled in the art in the light of the following description and accompanying drawings.

SUMMARY OF THE INVENTION

In accordance with this invention, generally stated, in a system wherein variations in voltage from an A.C. source are to be compensated, a solid state switch is provided which is electrically connected to the A.C. source, a triggering device is electrically connected to the solid state switch for triggering the solid state switch and a radiation responsive device is provided, having an electrically variable radiation source and a radiation sensitive resistor, the resistance of which varies as a function of the radiation from the radiation source, the radiation source being electrically connected to the A.C. source and the radiation sensitive resistor being electrically connected in parallel to capacitors electrically connected to the triggering device, whereby the charging rate of the capacitors is dependent upon and is a function of the resistance of the radiation sensitive resistor, and the intensity of the radiating source, hence the resistance of the radiation sensitive resistor, is dependent upon and a function of the source voltage. The characteristics of the radiation sensitive resistor are such that upon a rise in the source voltage, the charging rate of the capacitors tends to be reduced by the radiation sensitive resistor and increased by the increase in voltage, whereby the two tendencies substantially balance one another, to maintain a constant effective power into the load.

Means are provided to vary the intensity of the radiation to vary the resistance of the radiation sensitive resistor, hence the firing angle of the solid state switch.

In the preferred embodiment, the radiation responsive device is a photocouple cell having a lamp as the source of radiation and a photoconductive resistor, the resistance of which varies inversely as the amount of illumination.

Variable resistors, which can be manually variable or automatically variable in response to change of condition, e.g., thermistors, or combinations thereof, in the lamp circuit, which may be and preferably is a low voltage circuit, provide means for varying the intensity of the lamp.

A photocouple cell in the circuit can be used to bypass the system, to permit the solid state switch to be triggered at the beginning of each half-cycle, for high speed operation of a motor, for example.

DESCRIPTION OF THE PREFERRED EMBODIMENTS

Figure 1:
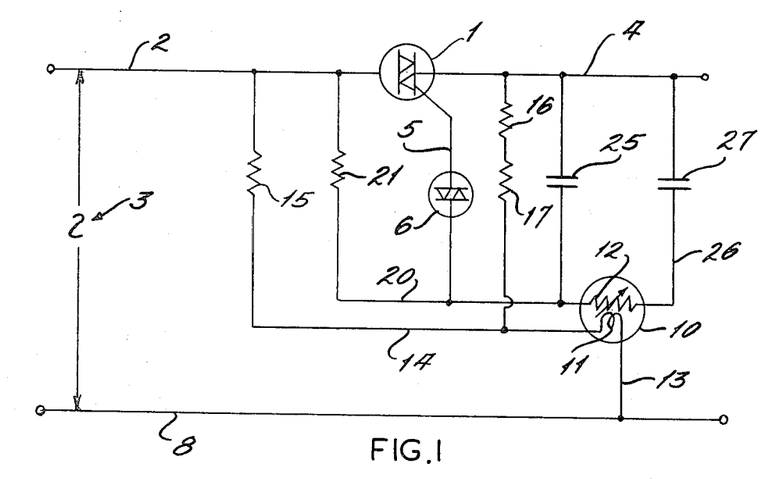
FIG. 1 is a circuit diagram illustrating a simple form of circuit of this invention, serving only a voltage regulating function at a fixed output.

Referring now to FIG. 1 for an illustration of a very simple form of system of this invention, applied as a voltage regulator, reference numeral 1 indicates a solid state switch in the form of a Triac, electrically connected to a conductor 2 from a source 3 of alternating current and to a conductor 4 electrically connected to a load, not here shown. A triggering diode 6 in connected, by means of a conductor 5, to a gate terminal of the Triac 1. A conductor 8, also connected to the source 3, is also electrically connected to the load. A photocouple cell 10, contains a lamp 11 and a photoconductive resistor 12. The lamp 11 is electrically connected, by a conductor 13, to the conductor 8 from the source 3, and by a conductor 14, through a bias resistor 15, to the conductor 2 from the source 3. The conductor 14 is also electrically connected, between the lamp 11 and the resistor 15, to resistors 16 and 17, which are electrically connected, in series with one another, to the conductor 4. The resistor 15 and resistors 16 and 17 are thus in parallel with one another. The photoconductive resistor 12 is electrically connected to a conductor 20. The conductor 20 is electrically connected through a resistor 21 to the conductor 2 from the source 3. It is also connected electrically to the triggering diode 6, and, through a capacitor 25, to the conductor 4. The photoconductive resistor 12 is also electrically connected, by means of a conductor 26 through a capacitor 27, to the conductor 4.

In operation, the values of the resistors 15, 16 and 17 are such that the lamp 11 has an intensity sufficient to cause the resistance of the photoconductive resistor 12 to be intermediate its limits. This means that with an increase in intensity of the lamp 11, there will be a decrease in the resistance of the photoconductive resistor 12, and vice versa. The charging rate of the capacitors 25 and 27 is thus intermediate the maximum rate which would be achieved if the resistance of the resistor 12 were infinite, and the minimum rate which would be achieved if the resistance of the resistor 12 were zero. Thus, an increase in the resistance, i.e., a decrease in the intensity of the lamp 11, tends to speed up the triggering of the Triac, and vice versa. Thus, an increase in the line voltage, which tends to increase charging rate of the capacitors 25 and 27 also causes an increase in the intensity of the lamp 11, which tends to slow down the charging rate. The result is a balancing out of the effects to achieve a substantially constant firing angle.

It can be seen that by making one of the resistors 16 and 17 a variable resistor, the intensity of the lamp 11 can be controlled, to vary the firing angle. However, at any setting of the variable resistor, the self-compensating characteristic of the system will minimize variations in output with variations in line voltage, and in load.

Figure 2:
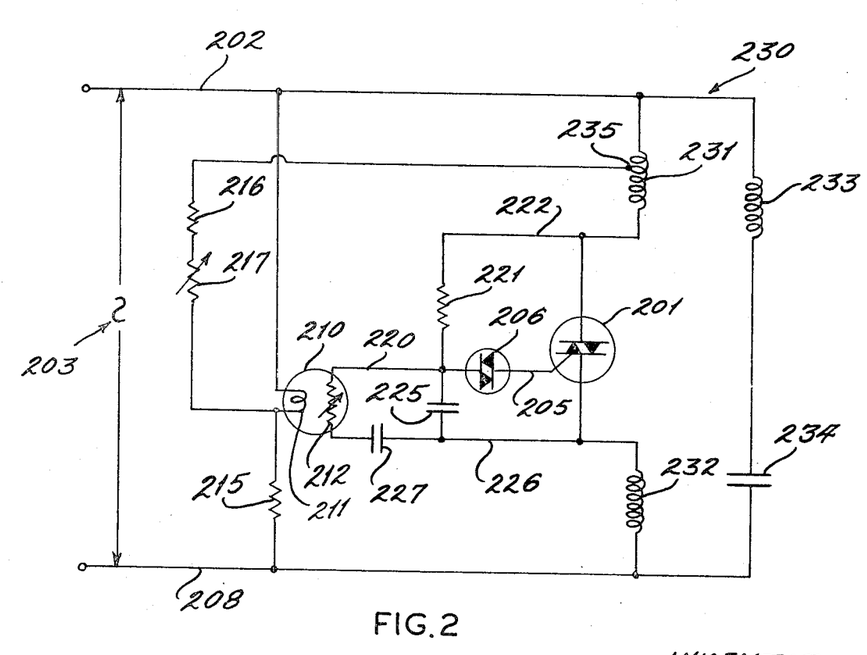
FIG. 2 is a circuit diagram illustrating another embodiment of the system of this invention, applied to a permanent split capacitor motor, the speed of which is controlled by the system and wherein current for a lamp is obtained from a tap on a main winding of the motor.

Referring now to FIG. 2, reference numeral 201 indicates a Triac which, in this embodiment, is electrically connected to a conductor 202 from a source 203 of alternating current and to a conductor 208 from the source 203. A triggering diode 206 is electrically connected, by means of a conductor 205, to a gate terminal of the Triac 201. In this embodiment, the Triac 201 is connected to the conductors 202 and 208 intermediate two parts, 231 and 232, of main windings of a permanent split capacitor motor 230, which also includes an auxilary winding 233 and a capacitor 234.

In this embodiment, the main winding is split, as in a motor described in copending application, Ser. No. 730,544 of Royer and Kitsch, now allowed. A conductor 226, electrically connected to the part 232 of the main winding, is electrically connected to the Triac 201, to a capacitor 227 and to a photoconductive resistor 212 of a photocouple cell 210. A capacitor 225 is electrically connected to the conductor 226 between the capacitor 227 and the Triac 201. The capacitor 225 is electrically connected to a conductor 220, which is electrically connected to the photoconductive resistor 212 and to the triggering diode 206. A resistor 221 is electrically connected to the conductor 220, and, by means of a conductor 222, to the Triac 201 and the part 231 of the main coil.

A lamp 211 in the photocouple cell 210 is electrically connected directly on one side to the conductor 202 from the source 203, is electrically connected on the other side, through a bias resistor 215 to the conductor 208 from the source 203, and also to a tap 235 on the main winding part 231, through a fixed resistor 216 and a variable resistor 217, connected in series.

In operation, assume that the lamp 211 is dark. The resistance of the photoconductive resistor 212 is so high as to make the circuit through it essentially open. Under these circumstances, the capacitor 225 charges rapidly through the resistor 221, and the critical voltage at the trigger diode is reached early in the half-cycle, triggering the Triac 201. If the lamp 211 is full on, the resistance of the photoconductive resistor 212 is low, causing the capacitors 225 and 227 to charge in parallel, and delaying the triggering of the Triac. At an intermediate intensity, the charging rate of the capacitors will have an intermediate value, thus causing the Triac to trigger at an intermediate firing angle. In this way, the speed of the motor 230 can be varied by varying the resistance of the variable resistor 217. The voltage compensating characteristic of this system is identical with that of the system illustrated in FIG. 1.

In this embodiment, the tap 235 from the main winding of the motor, provides a convenient source of low voltage and has the effect, because of the resultant negative feedback of stabilizing the system. The function of the bias resistor 215 is to supply a threshold voltage to the lamp 211, so that small variations in the voltage through the resistors 216 and 217 produce immediate variations in the intensity of the lamp 211. The photocoupler has a non-linear characteristic, exponential in nature, so that a change in bias current has a magnified effect. Therefore an optimum value for the bias resistor 215 can be determined. However, the voltage feedback circuit from the motor winding tap 235 through the variable resistor 217 provides a sensitive response to voltage fluctuation, so that the bias resistor 215 can in some applications, be eliminated.

Figure 3:
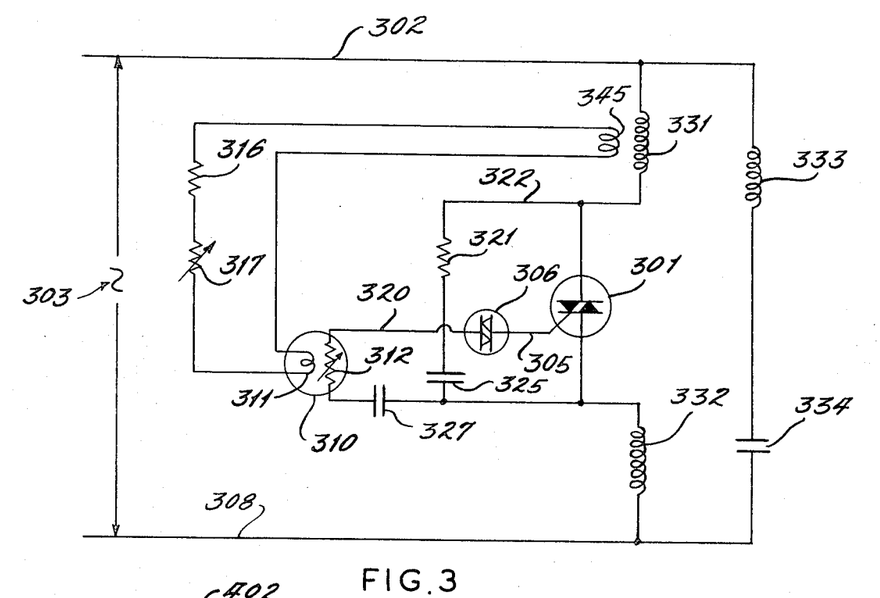
FIG. 3 is a circuit diagram illustrating still another embodiment of the system of this invention applied to a permanent split capacitor motor, wherein current for a lamp is obtained from a low voltage secondary winding.

Referring now to FIG. 3, the circuit of FIG. 3 is identical with that of FIG. 2, and the reference numerals are identical but for the use of a prefix 3 instead of 2, except that the bias resistor 215 of the circuit shown in FIG. 2 has been omitted, and, instead of the tap 235, an insulated low voltage secondary winding 345 has been introduced to provide an isolated, low voltage control circuit.

The operation of the system shown in FIG. 3 is identical with that of the system shown in FIG. 2, except that the threshold voltage is not provided by the bias resistor, so that the system of FIG. 3 will not be as sensitive as that of the system of FIG. 2.

Figure 4:
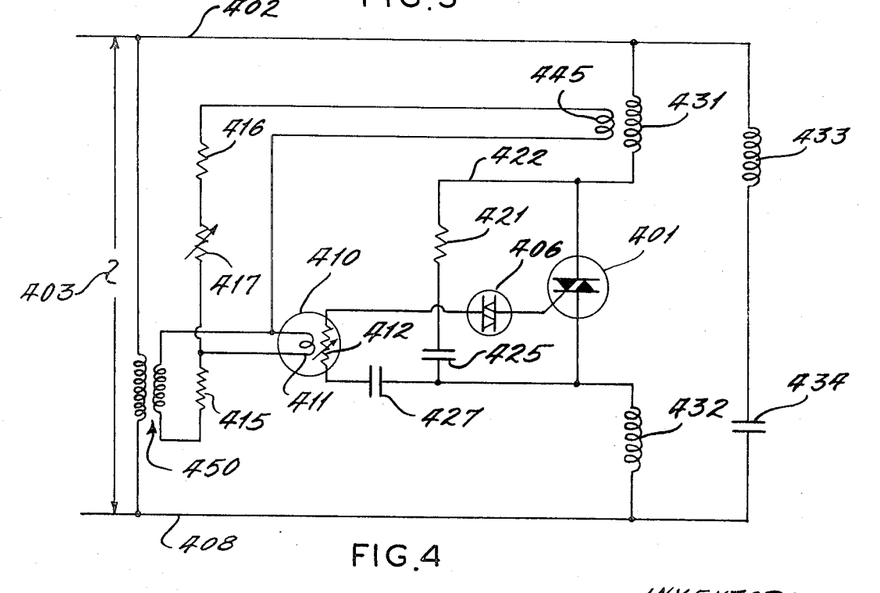
FIG. 4 is a circuit diagram illustrating still another embodiment of the system of this invention applied to a P.S.C. motor, wherein a separate bias source is provided for the lamp.

Referring now to FIG. 4, the circuit of FIG. 4 is identical with that of FIG. 3, but for the use of reference numerals with the prefix 4 rather than 3, except for the introduction of a bias resistor 415, and a step-down transformer 450, the primary winding of which is electrically connected across conductors 402 and 408 from the source. The operation of the system of FIG. 4 is substantially identical to that of the system illustrated in FIG. 2.

Figure 5:
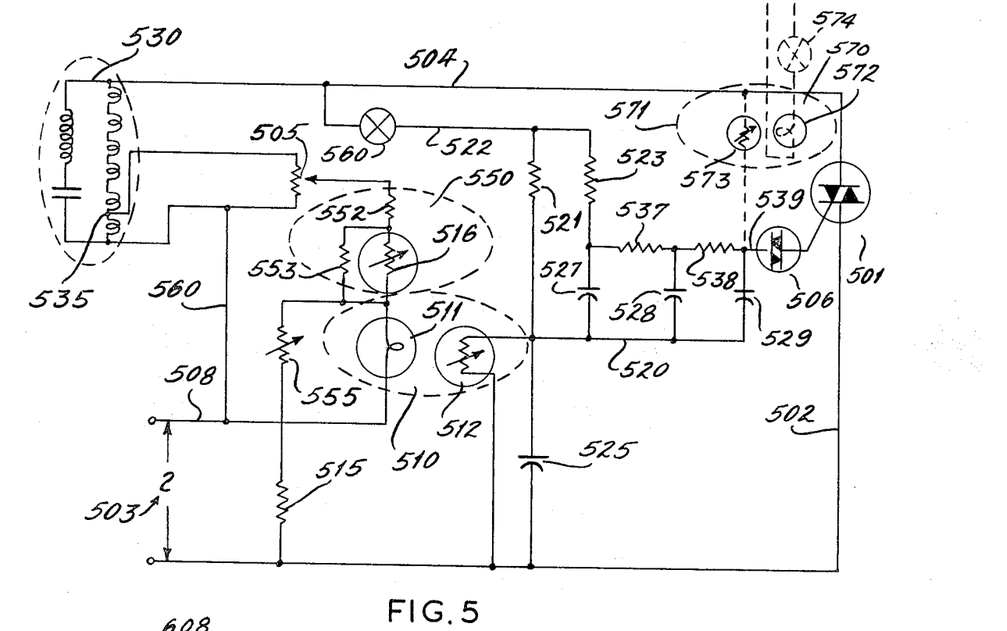
FIG. 5 is a circuit diagram illustrating still another embodiment of the system of this invention, in which a thermistor is provided and a remote switch.

Referring now to FIG. 5, the circuit illustrated in FIG. 5 is an automatic speed control in which a thermistor is used to respond to the needs of a furnace circulator. Reference numeral 501 indicates a Triac electrically connected by means of a conductor 502 to a source of alternating current 503. In this example, the Triac 501 is electrically connected by means of a conductor 504 to the windings of a P.S.C. motor 530. A tap 535 from the main winding provides low voltage to a control circuit which includes a variable resistor 505 and a thermistor 550 as well as a photocouple cell 510. The thermistor circuit incudes, besides a positive temperature coefficient thermistor element 516, trimming resistors 552 and 553. The photocouple cell includes a photoconductive resistor 512 and lamp 511. The lamp 511 is electrically connected to the thermistor 516 and to bias resistors 515 and 555. The bias resistors 515 and 555, are electrically connected in series with one another to the conductor 502. The lamp 511 is also electrically connected to a conductor 508 from the source 503. A conductor 560 is electrically connected between the conductor 508 and the windings of the motor 530. Electrically, the arrangement of the thermistor 550 and the bias resistors 515 and 555, with respect to the lamp 511, is no different from the arrangement shown in FIG. 2, except that the bias voltage can be varied by means of the variable bias resistor 555.

One side of the photoconductive resistor 512 is connected electrically to the conductor 502. The other side is connected electrically to a conductor 520 to which capacitors 527, 528 and 529 are connected. A capacitor 525 is electrically connected on one side to the conductor 502 and on the other to conductor 520. A conductor 522 is electrically connected, through an on-off switch 560, to the conductor 504. A resistor 521 is electrically connected to the conductor 522 and the conductor 520.

A resistor 523 is electrically connected to the conductor 522 and, through the capacitor 527, to the conductor 520. Resistors 537 and 538, are connected between capacitors 527 and 528 and 528 and 529 respectively, and, by means of a conductor 539, to a triggering diode 506, electrically connected to a gate terminal of the Triac 501.

A remote low voltage switch assembly 570, in this embodiment, consists of a photocouple cell 571 with a lamp 572 connected through an on-off switch 574, to a constant source of low voltage, and a photoconductive resistor 573, one side of which is connected to a conductor 504 and the other to a conductor 539. The assembly 570 merely illustrates how the circuit of this invention can be controlled easily by a low voltage switching signal. As shown, the assembly 570, when the lamp 572 is switched full on, overrides the on-off switch 560. This is useful, for example, when the assembly is used for an air-conditioner switch, permitting switching to a preset higher motor speed.

The operation of the system shown in FIG. 5 is essentially the same as that shown in FIGS. 2 and 4. The main difference lies in the fact that the speed of the motor is regulated by the temperature of the thermistor element 516. The assembly 570 merely acts to bypass the switch 560, in effect, and supply current to the conductor 539, hence the triggering diode 506, directly from the conductor 504.

Figure 6:
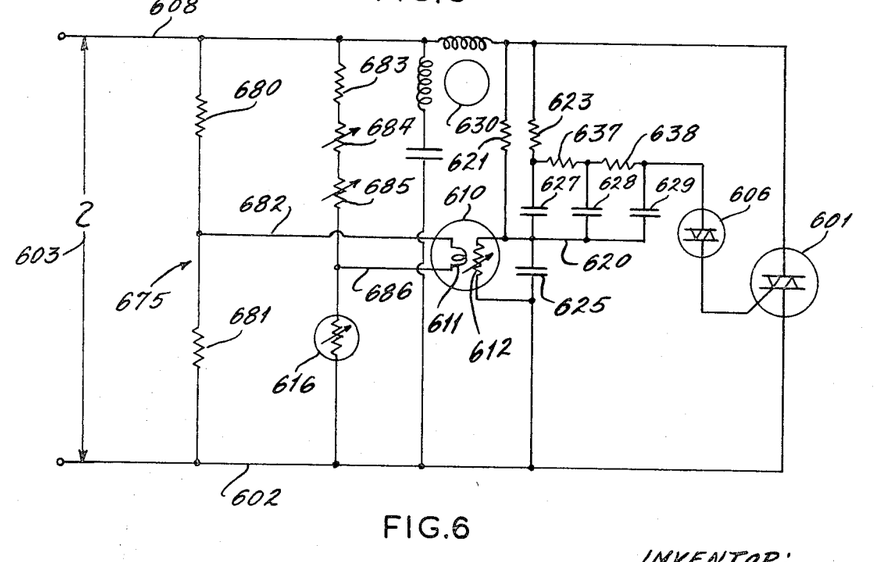
FIG. 6 is a circuit diagram illustrating still another illustrative embodiment of the system of this invention, which has a moderately high sensitivity.

In FIG. 6, a system similar to the system shown in FIG. 5 is illustrated, in which a thermistor 616 acts to regulate the speed of a motor 630. The particular circuit illustrated in FIG. 6 is capable of modulating the fan speed in a room air-conditioner from full to minimum in response to an air temperature change of about 5° Fahrenheit. The circuit of FIG. 6 differs in several respects from the circuit shown in FIG. 5, in having no remote control corresponding to the control 570, although such a control can readily be provided, and, more importantly, in having no negative voltage feedback arrangement. In the circuit shown in FIG. 6, an input bridge circuit 675, operating "across the line" gives the desired sensitivity. Conductors 602 and 608, Triac 601, triggering diode 606, capacitors 627, 628 and 629, resistors 621, 623, 637 and 638, and photocouple cell 610 with lamp 611 and photoconductive resistor 612, all have counterparts in the circuit illustrated in FIG. 5. A conductor 620, electrically connected to the photoconductive resistor 612, is electrically connected to the resistors 621 and 623, the capacitors 627, 628 and 629, and a capacitor 625 in the same way in which the conductor 520 of the circuit shown in FIG. 5 is connected to the counterpart elements.

In this embodiment of circuit, resistors 680 and 681, electrically connected in series with one another and between the conductors 602 and 608 from a source 603, are electrically connected, intermediate the resistors 680 and 681 to one side of the lamp 611, by means of a conductor 682. Resistor 683, variable resistors 684 and 685 and thermistor 616 are connected in series with one another to and between conductors 602 and 608, and are electrically connected, between variable resistor 685 and the thermistor 616, to the other side of the lamp 611, by means of a conductor 686.

As can be seen from the drawing, the flow of current through the lamp 611 is governed by the imbalance of the bridge circuit 675.

Figure 7:
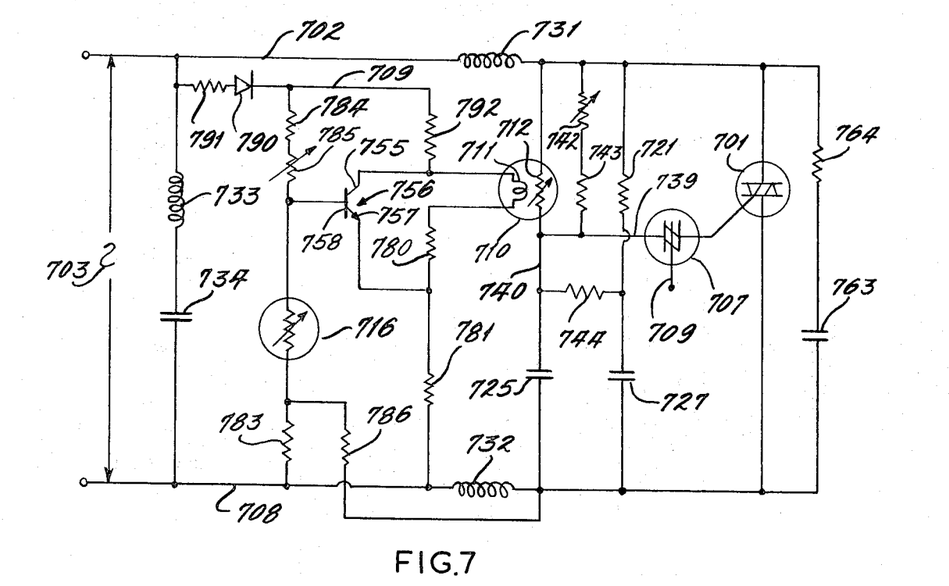
FIG. 7 is a circuit diagram illustrating still another illustrative embodiment of the system of this invention, with high sensitivity.

Referring now to FIG. 7 for still another embodiment of the system of this invention, the system illustrated in FIG. 7 also employs an input bridge similar in function to the in-put bridge of the embodiment shown in FIG. 6. However, the input bridge of the system shown in FIG. 7 employs a transistor, the emitter-base junction of which measures the bridge output.

As in the circuits illustrated in FIGS. 2, 3 and 4, a Triac 701 is positioned between parts 731 and 732 of the main winding of a P.S.C. motor. In this embodiment, a commutating capacitor 763 and a resistor 764 serve a function with respect to the motor, but are not essential to the operation of the control portion of the circuit.

In this embodiment a silicon bilateral switch (S.B.S.) 707 is used as the triggering device. A gate lead 709 on the S.B.S. 707, is not used in this application of the S.B.S. The S.B.S. 707 is electrically connected to a gate terminal of the Triac 701 and to a conductor 739 electrically connected to a conductor 740. The conductor 740 is electrically connected to a photoconductive resistor 712 in a photocouple cell 710. The photoconductive resistor 712 is also electrically connected, between the parts 731 and 732 of the main winding, to conductor 702 from a source 703. The conductor 740 is also electrically connected to a capacitor 725 which is electrically connected, between parts 731 and 732 of the main winding, to the conductor 708. A variable resistor 742 and a resistor 743 are electrically connected in series with one another to and between the conductor 739 and the conductor 702, between the parts 731 and 732 to provide an adjustable minimum speed. A resistor 721 and capacitor 727 are electrically connected to one another and to and between the conductors 702 and 708, between the parts 731 and 732. A resistor 744 is electrically connected to the conductor 740 between the photoconductive resistor 712 and the capacitor 725, on one side, and to a conductor between the resistor 721 and the capacitor 727.

A lamp 711 in the photocouple cell 710 is electrically connected to a collector 755 of a transistor 756 on one side, and, through a resistor 780, to an emitter 757 of the transistor 756 and, through a resistor 781, to the conductor 708.

Resistor 784 and variable resistor 785, are connected in series with one another and with a thermistor 716 and a resistor 783 to and between the conductor 708 and a conductor 709. The conductor 709 is electrically connected to a diode 790, which is electrically connected, through a resistor 791, to the conductor 702. The electrical connection between the resistor 791 and conductor 702 is shown as being made along a lead to an auxiliary winding 733 and capacitor 734 of the motor. A resistor 792 is electrically connected to the conductor 709 and to a conductor intermediate the lamp 711 and the collector 755. A base 758 of the transistor 756 is electrically connected to a conductor between the variable resistor 785 and the thermistor 716. A resistor 786 is electrically connected to a conductor between the thermistor 716 and the resistor 783, and to the conductor 708 intermediate the parts 731 and 732.

The diode 790 provides pulsating D.C. power to the control circuit. The control circuit is in the form of a bridge, with the emitter-base junction of the transistor measuring the bridge output. The conduction of the transistor shunts the lamp 711 to vary the resistance of the photoconductive resistor 712. Since the conduction of the transistor is highly responsive to current supplied to the base of the transistor, hence to the resistance of the thermistor 716, the control is very sensitive. For example, in practice, a change in sensor (thermistor) resistance from 305 ohms to 308 ohms changes the motor speed from maximum speed to minimum speed. For a typical negative temperature coefficient thermistor, this is equivalent to a temperature differential of about one-half degree Fahrenheit. Voltage compensation in this circuit is accomplished by forcing a bridge unbalance due to the emitter-base potential of the silicon transistor. With changing line voltage this unbalance offsets the combined effects of the photocouple cell, the firing circuit, and the changing supply voltage to the motor.

Figure 8:
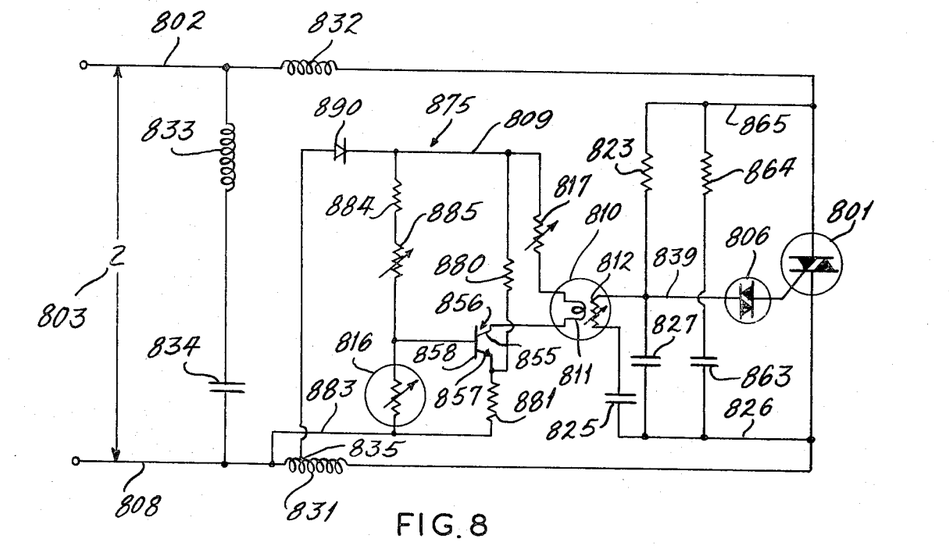
FIG. 8 is a circuit diagram illustrating still another embodiment of the system of this invention, which provides moderately high sensitivity with a minimum speed setting which is voltage compensated.

The circuit illustrated in FIG. 8 provides moderately high sensitivity with a simple circuit and, additionally, provides a minimum speed setting which is voltage compensated. In this circuit, a tap 835 on a part 831 of a main winding of a P.S.C. motor, provides low voltage to a diode 890 and provides for a negative feedback which insures a high degree of stability at the expense of a somewhat reduced sensitivity.

The motor of this embodiment has another main winding part 832, an auxiliary winding 833 and a capacitor 834, all electrically connected to conductors 802 and 808 from an A. C. source 803. A Triac 801 is electrically connected, between the parts 831 and 832 of the main winding, to the conductors 808 and 802. A gate terminal of the Triac 801 is electrically connected to a triggering diode 806 which is electrically connected to a photosensitive resistor 812 of a photocouple cell 810. The other side of the photoconductive resistor 812 is electrically connected to a capacitor 825 which is electrically connected by a conductor 826, intermediate the part 831 and the Triac 801 to the conductor 808. A commutating capacitor 863 and a resistor 864 are electrically connected to one another and to and between the conductor 826 and a conductor 865 which is in turn electrically connected, between the part 832 and the Triac 801, to the conductor 802. A capacitor 827 is electrically connected to and between the conductor 826 and a conductor 839 between the triggering diode 806 and the photosensitive resistor 812. A resistor 823 is electrically connected to and between the conductors 839 and 865.

A bridge circuit 875, supplied with pulsed D.C. by the diode 890, includes a conductor 809 from the diode 890, a conductor 883 electrically connected to the conductor 808, ahead of the part 831, a resistor 884, variable resistor 885 and sensor 816 connected in series with one another to and between the conductors 809 and 883, resistors 880 and 881, electrically connected in series with one another and to and between conductors 809 and 883, and a transistor 856. A base 858 of the transistor 856 is electrically connected to a conductor between the variable resistor 885 and sensor 816. An emitter 857 of the transistor 856 is electrically connected to a conductor between the resistors 880 and 881. A collector 855 of the transistor 856 is electrically connected to a lamp 811 of the photocouple cell 810. The lamp 811 is also electrically connected to a variable resistor 817 electrically connected to the conductor 809.

The operation of the circuit shown in FIG. 8 is substantially the same as that of the circuit shown in FIG. 7, the characteristics of the two circuits differing in the ways which have been pointed out above.

Figure 9:
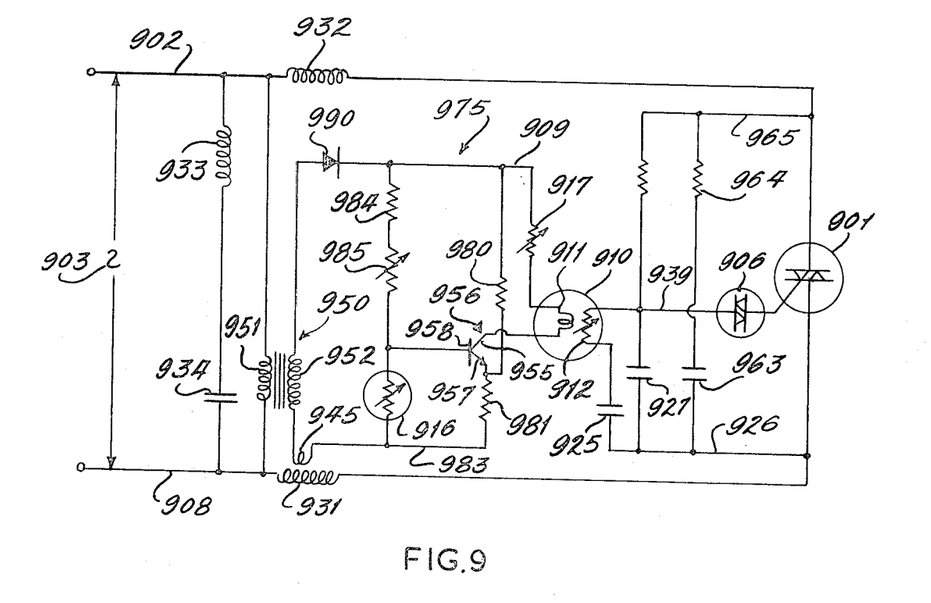
FIG. 9 is a circuit diagram illustrating still another embodiment of the system of this invention, with high sensitivity and voltage compensated minimum speed.

The circuit shown in FIG. 9, combines features of the circuits shown in FIGS. 7 and 8. In the circuit shown in FIG. 9, the low voltage tap of the circuit shown in FIG. 8 is replaced by a separate step-down transformer, while at the same time, an amount of negative feedback is provided by an insulated coil of very low voltage coupled to a part of the main winding.

The circuit includes parts 931 and 932 of a main winding of a P.S.C. motor, an auxiliary winding 933 and capacitor 934, all electrically connected to and between conductors 902 and 908 from a source 903. A step-down transformer 950 has a primary winding 951 electrically connected to and between conductors 902 and 908, and a secondary winding 952 electrically connected at one end to a diode 990 and at its other end to an insulated coil 945 of very low voltage, coupled to the part 931 of the main winding of the motor. A bridge circuit 975 is identical with the bridge circuit 875 of the circuit shown in FIG. 8, and the various elements have identical reference numerals except for the prefix 9. A variable resistor 917, electrically connected to a conductor 909, is electrically connected to one side of a lamp 911 of a photocouple cell 910. The other side of the lamp 911 is electrically connected to a collector 955 of a transistor 956. A photoconductive resistor 912 of the photocouple cell 910 is electrically connected by means of a conductor 939 to a triggering diode 906, which in turns is electrically connected to a gate terminal of a Triac 901. The photoconductive resistor 912 is electrically connected to a capacitor 925, electrically connected to a conductor 926 which in turn is electrically connected, between the Triac 901 and the part 931 to the conductor 908. A capacitor 927 is electrically connected to and between the conductors 926 and 939. A resistor 923 is electrically connected to and between the conductor 939 and a conductor 965, which in turn is electrically connected, between the part 932 and the Triac 901 to the conductor 902. A resistor 964 and commutating capacitor 963 are electrically connected to one another and to and between the conductors 926 and 965.

The operation of the circuit shown in FIG. 9 is the same as that of the circuits shown in FIGS. 2 through 8, in that variations in line voltage are compensated, and variations, introduced either manually or by sensor or by some electro-mechanical device, in the resistance in the lamp circuit, hence variations in the intensity of the illumination by the lamp, are utilized to vary the speed of the motor to produce variations in the firing angle of the solid state switch.

The term "connected" is used in the claims to embrace a direct connection, a mediate connection, as, for example, the connection of the Triac to the conductors 908 and 902 intermediate the main winding parts 931 and 932, and electrical coupling as by a transformer coil, as in the circuit shown in FIG. 3 where the lamp 311 is connected to the source current by way of the coil 345, or any combination, as in the connection of the lamp 911 to the source by way of the diode 990 and transformer 950.

Merely by way of illustration and not by way of limitation, in a 115 volt one-half horsepower electric motor, suitable values and characteristics of the elements may be as follows:

| Circuit of FIG. 2 | Standard product source or value |
|---|---|
| Triac 201 | GE #SC-45B. |
| Triggering diode 206 | GE #ST-2. |
| Capacitor 227 | .47 farad. |
| Capacitor 225 | .047 farad. |
| Photoconductive resistor 212 | Vactec Corp. #VT10-L. |
| Lamp 211 | GE #583. |
| Resistor 215 | 10K ohms. |
| Variable resistor 217 | 0-2000 ohms. |
| Resistor 216 | 330 ohms. |
| Resistor 221 | 27K ohms. |

Circuit of FIG. 3
  The same values can be used except that the secondary winding 345 represents 10% of the total main winding.

Circuit of FIG. 4
  The same values may be used except that the step-down transformer 450 provides 24 volts and the bias resistor 415 has a value of 2.2K ohms.

Circuit of FIG. 5 — Standard product source or value

| Component | Value |
|---|---|
| Triac 501 | GE #SC-45B. |
| Triggering diode 506 | GE #ST-2. |
| Variable resistor 505 | 0–1K ohms. |
| PTC thermistor 516 | Carborundum Co. #E0606P11. |
| Lamp 511 | GE #49. |
| Photoconductive resistor 512 | Vactec #VT10-L. |
| Bias resistor 515 | 3K ohms. |
| Bias resistor 555 | 0–10K ohms. |
| Resistor 521 | 4.7K ohms. |
| Resistors 523, 537, 538 | 10K ohms. |
| Capacitors 525, 529 | .1 farad. |
| Capacitor 527 | .15 farad. |
| Capacitor 528 | .22 farad. |
| Lamp 572 | GE #49. |
| Photoconductive resistor 573 | Vactec #VT10-L. |

Circuit of FIG. 6

| Component | Value |
|---|---|
| Triac 601 | GE #SC-45B. |
| Triggering diode 606 | GE #ST-2. |
| Resistor 621 | 4.7K ohms. |
| Resistor 623 | 10K ohms. |
| Resistor 637 | 22K ohms. |
| Resistor 638 | 33K ohms. |
| Resistor 680 | 1.5K ohms. |
| Resistor 681 | 270 ohms. |
| Resistor 683 | 2.7K ohms. |
| Variable resistor 684 | 750 ohms. |
| Variable resistor 685 | 500 ohms. |
| PTC thermistor 616 | Carborundum #A1406P11. |
| Capacitors 625, 627, 628 and 629 | .1 farad. |
| Lamp 611 | Chicago Miniature #344. |
| Photoconductive resistor 612 | Vactec #VT10-L. |

Circuit of FIG. 7

| Component | Value |
|---|---|
| Triac 701 | GE #SC-45B. |
| Resistor 721 | 100K ohms. |
| Resistor 742 | 0–5 megohms. |
| Resistor 743 | .47 megohms. |
| Resistor 744 | 150K ohms. |
| Resistor 764 | 470 ohms. |
| Resistor 780 | 47 ohms. |
| Resistor 781 | 27 ohms. |
| Resistor 783 | 10 ohms. |
| Resistor 784 | 2.7K ohms. |
| Resistor 785 | 0–10K ohms. |
| Resistor 786 | 6.8K ohms. |
| Resistor 791 | 0 (for 115 v. operation). |
| Resistor 792 | 1.5K ohms. |
| Capacitors 725, 727 | .1 microfarad. |
| Capacitor 763 | .047 farad. |
| Photoconductive resistor 712 | Vactec #VT10-L. |
| Lamp 711 | GE #49. |
| NTC thermistor 716 | Gulton #21TE1. |
| Diode 790 | GE #504A. |
| Thermistor 756 | GE #2N2712. |

If the motor is operated at 230V:

| Component | Value |
|---|---|
| Resistor 721 | 220K ohms. |
| Resistor 786 | 15K ohms. |
| Resistor 791 | 1.5K ohms. |

Circuit of FIG. 8

| Component | Value |
|---|---|
| Triac 801 | RCA #TA7364. |
| Triggering diode 806 | RCA #7330. |
| NTC thermistor 816 | GE #1D-504. |
| Lamp 811 | GE #583. |
| Photoconductive resistor 812 | Vactec #VT10-L. |
| Diode 890 | International Rectifier #4D05. |
| Transistor 856 | GE #2N2712. |
| Resistor 817 | 0–100 ohms. |
| Resistor 823 | 27K ohms. |
| Resistor 864 | 470 ohms. |
| Resistor 881 | 10 ohms. |
| Resistor 884 | 100 ohms. |
| Resistor 885 | 0–500 ohms. |
| Capacitor 825 | .47 farad. |
| Capacitors 827, 863 | 0.47 farad. |

If the motor is operated at 230V:

| Component | Value |
|---|---|
| Triac 801 | RCA #TA7365. |
| Resistor 823 | 47K ohms. |

Circuit of FIG. 9

The values can be the same as those for the components shown in FIG. 8, except for the coil 945 and the step-down transformer 950. The step-down transformer 950 can supply 14 volts.

In the circuit of FIG. 2, the tap 235 can be at ⅛ of the total main. In the circuits of FIGS. 3 and 4, the coils 345 and 445 can be at 1/10 of the total main. In the circuit of FIG. 5, the tap 535 can be at ⅙ of the total main. In the circuit of FIG. 8, the tap 835 can be at ⅑ of the total main when the motor is operated at 115 v. and 1/18 of the total main when the motor is operated at 230 v. In the circuit of FIG. 9, the transformer can supply 14 v. and the secondary coil 945 can be at 1/90 of the total main when the motor is operated at 115 v. and 1/180 of the total main when the motor is operated at 230 v.

Numerous variations in the construction of the circuits of this invention, within the scope of the appended claims, will occur to those skilled in the art in the light of the foregoing disclosure. For example, it is evident that a resistor sensitive to variations of some radiation different from light, e.g., heat, could be used in conjunction with a source of the appropriate radiation, the intensity of which can be varied electrically. The photocouple cell is particularly desirable because it is less sensitive to ordinary ambient conditions than a thermistor, for example, would be. The circuit can be used in connection with numerous other loads, such as, for example, a photographic light source or D.C. power supply. These are merely illustrative of possible variations.

Having thus described the invention, what is claimed and desired to be secured by Letters Patent is:

1. In a motor system having an electrical motor with a main winding wherein variations in voltage from an A.C. source are to be compensated, the improvement comprising a solid state switch electrically connected to said electric motor; triggering means electrically connected to said solid state switch for triggering said solid state switch; and a photocouple cell having a lamp and a photoconductive resistor, said lamp being electrically connected to means operatively associated with said main winding for providing a low voltage source to said lamp from said main winding and said photoconductive resistor being electrically connected in parallel to capacitors electrically connected to said triggering means, whereby the charging rate of said capacitors is dependent upon and a function of the resistance of said photoconductive resistor, and the intensity of the lamp, hence the resistance of the photoconductive resistor, is dependent upon and a function of the voltage across said main winding.

2. The system of claim 1 wherein the means for providing a low voltage source to said lamp from said main winding comprises a connection between the lamp and main winding at a tap intermediate the ends of the main winding.

3. The system of claim 2 wherein a rectifier is electrically connected to the main winding tap and to one side of the lamp, a transistor having a base, emitter, and collector is electrically connected to the rectifier and its collector, to the other side of the lamp, a selectively variable resistor and a thermistor electrically connected in series with one another are electrically connected to said rectifier, and the base of the transistor is electrically connected to and intermediate said selectively variable resistor and said thermistor.

4. The system of claim 1 wherein the means for providing a low voltage source to said lamp from said main winding comprises a transformer coupling.

5. The system of claim 1 wherein a variable resistor is electrically connected between said lamp and said main winding.

6. The system of claim 5 wherein the lamp is electrically connected in parallel with said variable resistor to a bias circuit resistor electrically connected to the said source at a point removed from said main winding.

7. The system of claim 2 wherein a manually selectable variable resistor and a thermistor are electrically connected in series between the main winding tap and the said lamp.

8. The system of claim 6 wherein the electrical connection between the bias circuit resistor and the source is a transformer coupling.

9. A motor system having an electric motor with a main winding wherein variations in voltage from an A.C. source are compensated comprising:
a solid state switch electrically connected to said electric motor;
triggering means electrically connected to said solid state switch for triggering said solid state switch;
a first photocouple cell having a lamp and a photoconductive resistor, said lamp being electrically connected to said A.C. source and said photoconductive resistor being electrically connected in parallel to capacitors electrically connected to said triggering means, whereby the charging rate of said capacitors is dependent upon and a function of the resistance of said photoconductive resistor, and the intensity of the lamp, hence the resistance of the photoconductive resistor, is dependent upon and a function of the voltage source; and
a second photocouple cell having a lamp and a photoconductive resistor, said photoconductive resistor being electrically connected to said triggering means and said lamp being electrically connected to said A.C. source; and
on-off switch means electrically connected between said lamp of said second photocouple cell and said source, and adapted to turn said lamp on and off.

10. A motor system having an electrical motor with a main winding wherein variations in voltage from an A.C. source are compensated comprising:
a solid state switch electrically connected to said electric motor;
triggering means electrically connected to said solid state switch for triggering said solid state switch;
a photoconductive cell having a lamp and a photoconductive resistor, said lamp being electrically connected to the source on one side to and between resistors connected in series across said source and on the other side to and between resistors connected in series across said source to provide a bridge circuit, current flowing through said lamp being a function of the relative value of said resistors and at least one of said resistors being variable.

11. The system of claim 10 wherein a transistor is electrically connected in said bridge circuit and to said lamp whereby the emitter-base junction of the transistor measures the bridge output, and the collector of the transistor, electrically connected to the lamp, controls the flow of current through said lamp.

12. The system of claim 11 wherein a rectifier, electrically connected to supply D.C. current to the lamp and bridge circuit, is electrically connected to a step-down transformer electrically connected to the A.C. source and the bridge circuit is electrically connected to an insulated winding of low voltage electrically coupled to the main winding.

13. The system of claim 10 wherein a rectifier, electrically connected to supply D.C. current to the lamp and bridge circuit, is electrically connected to and intermediate the ends of the main winding of the motor.

14. The system of claim 10 wherein the bridge circuit is electrically connected to a step-down transformer of low voltage electrically connected to the A.C. source.

References Cited
UNITED STATES PATENTS

| | | | |
|---|---|---|---|
| 3,344,311 | 9/1967 | Nuckolls | 323—22 XR |
| 3,385,077 | 5/1968 | Marsteller | 323—22 XR |
| 3,403,315 | 9/1968 | Maynard | 318—227 |
| 3,424,967 | 1/1969 | Keller | 318—345 |
| 3,463,990 | 8/1969 | Ross | 318—345 XR |

OTHER REFERENCES

A.C. Motor Speed Control, Mungenast & Dowling, Home Appliance Builder, August 1964, pp. 13-15, 38.

ORIS L. RADER, Primary Examiner

G. Z. RUBINSON, Assistant Examiner

U.S. Cl. X.R.

318—230, 345; 323—21, 24